(No Model.)

E. C. & A. M. GORDON.
HEDGE TRIMMER.

No. 553,116.   Patented Jan. 14, 1896.

WITNESSES:
Chas. Nida
J. B. Acker

INVENTORS:
E. C. Gordon
A. M. Gordon
BY
Munn & Co.
ATTORNEYS.

UNITED STATES PATENT OFFICE.

EDWARD C. GORDON AND ALPHUS M. GORDON, OF CHETOPA, KANSAS.

HEDGE-TRIMMER.

SPECIFICATION forming part of Letters Patent No. 553,116, dated January 14, 1896.

Application filed January 15, 1895. Serial No. 534,987. (No model.)

*To all whom it may concern:*

Be it known that we, EDWARD C. GORDON and ALPHUS M. GORDON, of Chetopa, in the county of Labette and State of Kansas, have invented a new and Improved Hedge-Trimmer, of which the following is full, clear, and exact description.

Our invention relates particularly to an improvement on a hedge-trimmer for which Letters Patent were granted to us May 30, 1893, No. 498,713; and the object of the present invention is to provide a cutting apparatus for a horse-power hedge-trimmer that will need no substantial and costly driving-gear of its own, but can be secured to the shoe of a grass-mower and be operated by the driving-gear of the mower in like manner as if it had been made for that sole purpose.

A further object of the invention is to enable the cutter to be readily adjusted and controlled so as to cut either side of the hedge from top to bottom, or cut across the top of the hedge from side to side, at the will of the driver, and to make the hedge-fence of any desired height or width.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both views.

Figure 1:
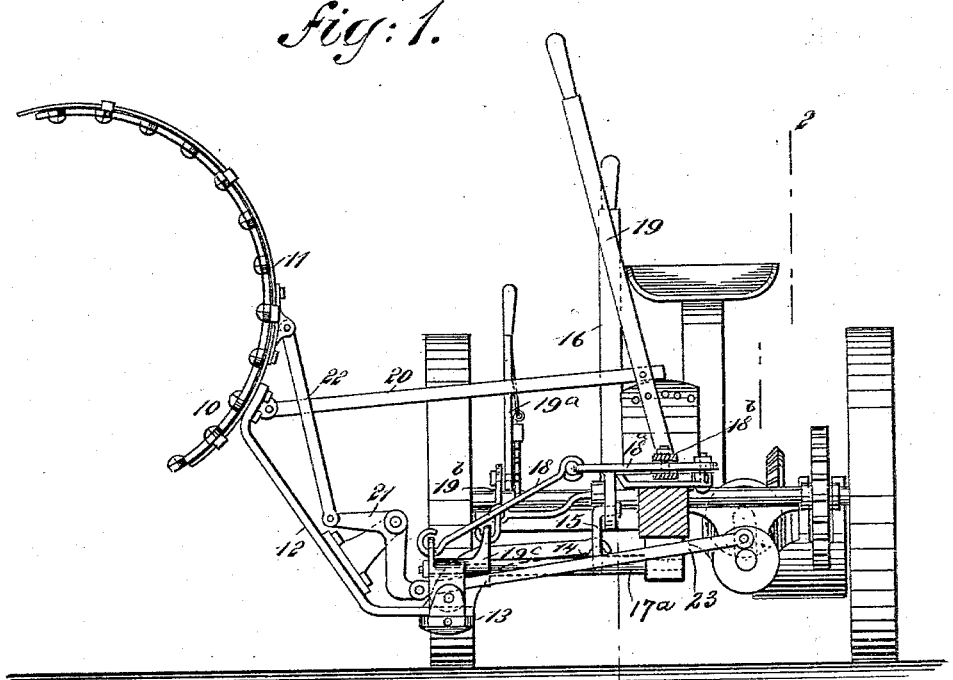
Figure 2:
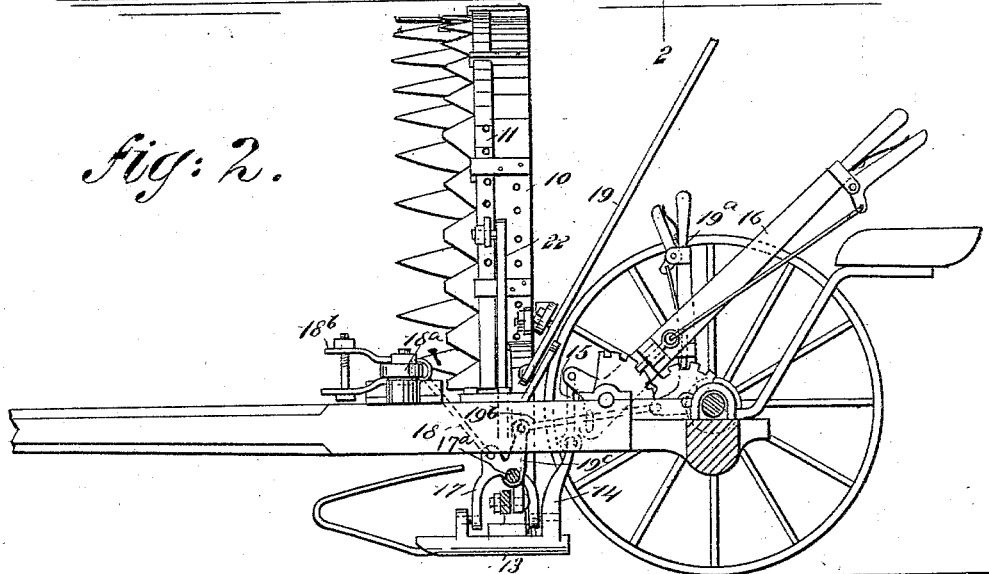

Figure 1 is a front elevation of a mower having the hedge-trimmer attached, the tongue or pole of the mower being in section; and Fig. 2 is a section taken substantially on the line 2 2 of Fig. 1.

The prime object of this invention is to make the finger-bar 10 a true circle from end to end, the sickle or cutter bar 11 being of a like formation. Both of these parts may represent a segment of a circle, the segments being of any desired circumferential proportions, and the finger-bar is adjustably attached at or near its lower end to a supporting-arm 12, and this arm extends downward to an attachment to a shoe 13, and the rear end of the said shoe is provided with an extension 14, connected by a link 15, or its equivalent, with a lift-lever 16, the said shoe 13 being fulcrumed upon a yoke 17, or its equivalent, which yoke is supported by links 18 and 18$^a$, the link 18$^a$ being pivoted to the frame and connected with the clevis 18$^b$.

The yoke 17 is mounted upon the outer end of the connecting-rod 17$^a$ of the mower, and the entire cutting apparatus is thus adapted to turn upon the connecting-rod.

A truly lateral adjustment may be made, when desired, by means of a link 20, connected with a lever 19, which link is connected with the finger-bar preferably at or near its connection to the supporting-arm 12, the said link 20 being pivotally connected with the lift-lever 19 above its fulcrum, and the said lever 19 is fulcrumed at any suitable point on the frame, as shown in Fig. 1.

The adjustment of the finger-bar and cutter-bar backward or forward to the desired position is accomplished by means of a lever 19$^a$, connected usually by a link 19$^b$ with a crank-arm 19$^c$ on the yoke 17, as shown in Fig. 2. When the lever is moved the yoke is tilted on the connecting-rod, thus swinging the top of the cutter backward or forward, as desired.

An elbow or crank lever 21 is fulcrumed upon a suitable support carried by the supporting-arm 12, as is likewise shown in Fig. 1, and one member of this bell-crank lever is connected with the sickle or cutter bar lever by means of a pitman 22, the other end of the said bell-crank lever being attached to the mower-pitman in any approved manner.

The curved finger-bar is adjustably secured to the supporting-bracket, and can be attached at any part of its curve to the bracket, either at or near the lower end to extend entirely over the hedge, or at any desired point between the ends, so as to trim one side of the hedge, from top to bottom. The finger-bar is provided with a series of perforations to permit of this adjustment, and the cutter-bar is also provided with a series of perforations to permit of its being adjustably connected with the pitman 22.

Thus it will be observed that the cutter may be readily adjusted and controlled to cut either one side of a hedge, from top to bottom, as before stated, or cut quite across the top of the hedge, from side to side thereof, and the adjustment of the cutters is under the complete control of the driver; and, furthermore, the attachment, as heretofore stated, may be made to any of the numerous lawn-mowers by removing the ordinary sickle-bar therefrom.

Having thus described our invention, we claim as new and desire to secure by Letters Patent—

1. In a hedge trimmer, a finger bar bent to a true circle from end to end, a sickle or cutter bar held to reciprocate on the finger-bar and of like longitudinal shape, mechanism for reciprocating the cutter bar adjustably connected therewith, and a support to which the said finger bar is adjustably secured, as and for the purpose set forth.

2. A finger bar bent on a true circle from end to end, a sickle or cutter bar of corresponding shape and held to slide on the finger bar, a support to which said finger bar is adjustably secured, levers whereby the finger and cutter bars may be vertically adjusted, or adjusted in a diagonal direction, and a driving mechanism connected with the sickle or cutter bar, as and for the purpose set forth.

3. In a hedge trimmer, a finger bar bent on a true circle from end to end, a sickle or cutter bar correspondingly shaped and having sliding movement on the finger bar, a pivotal support connected with the finger bar, maintaining it in predetermined position, the said finger bar being adjustably connected with the support, a shifting lever connected with the said pivotal support, a hoist lever likewise connected with the said pivotal support of the finger bar, and means, substantially as described, for driving the sickle or cutter bar from a mower pitman, as and for the purpose set forth.

4. In a hedge trimmer, the combination with the connecting bar of a grass mower, and the yoke at the outer end of the same, of a shoe hinged to the said yoke, a finger bar bent on a true circle from end to end, a bracket connected with the shoe and to which the said finger bar is adjustably secured, a correspondingly curved cutter bar mounted on the finger bar, a bell crank lever secured to the said bracket and having one of its arms connected with the mower pitman, and a pitman connecting the other arm of the said lever with the cutter bar, the said pitman and cutter bar being adjustably connected, substantially as shown and described.

EDWARD C. GORDON.
ALPHUS M. GORDON.

Witnesses:
G. S. GILES,
L. F. LOZIER.